(12) United States Patent
Skwarecki et al.

(10) Patent No.: US 7,526,726 B1
(45) Date of Patent: Apr. 28, 2009

(54) SYSTEM AND METHOD FOR GENERATING PRESENTATIONS

(75) Inventors: Edward Skwarecki, Moraga, CA (US); Bob Pappas, Inver Grove Heights, MN (US); Ken Eckey, Davis, CA (US)

(73) Assignee: Adobe Systems Incorporated, San Jose, CA (US)

( * ) Notice: Subject to any disclaimer, the term of this patent is extended or adjusted under 35 U.S.C. 154(b) by 263 days.

(21) Appl. No.: 11/213,185

(22) Filed: Aug. 25, 2005

Related U.S. Application Data

(60) Provisional application No. 60/604,670, filed on Aug. 25, 2004.

(51) Int. Cl.
  *G06F 3/00* (2006.01)
  *G06F 3/14* (2006.01)
(52) U.S. Cl. .................. 715/731; 715/853; 715/730; 715/732; 715/765
(58) Field of Classification Search ................ 715/704, 715/730–733, 762–765, 810, 835, 846, 853, 715/967, 200, 209; 707/1, 7, 104.1, 200, 707/205
See application file for complete search history.

(56) References Cited

U.S. PATENT DOCUMENTS

| | | | | |
|---|---|---|---|---|
| 5,819,301 A | * | 10/1998 | Rowe et al. .................. 715/513 |
| 6,111,578 A | * | 8/2000 | Tesler .......................... 715/850 |
| 6,160,549 A | * | 12/2000 | Touma et al. ................ 715/762 |
| 6,484,189 B1 | * | 11/2002 | Gerlach et al. .............. 715/526 |
| 6,573,907 B1 | * | 6/2003 | Madrane ...................... 715/719 |
| 7,143,177 B1 | * | 11/2006 | Johnson et al. ............. 709/231 |
| 2003/0142145 A1 | * | 7/2003 | Bennett et al. .............. 345/853 |
| 2003/0229607 A1 | * | 12/2003 | Zellweger et al. ............. 707/1 |
| 2003/0229616 A1 | * | 12/2003 | Wong ............................. 707/1 |
| 2005/0138570 A1 | * | 6/2005 | Good et al. .................. 715/789 |

OTHER PUBLICATIONS

"Lectora delivers results"; Lectora® Publisher, published by Trivantis; © 2004 Trivantis Corporation; website no longer available.
"Get more with Lectora® 2004"; Lectora © Publisher, published by Trivantis; © 2004 Trivantis Corporation; website no longer available.
Apple Computer, Inc. "Keynote User's Guide", 2003, downloaded from the Internet at http://download.info.apple.com/Apple_Support_Area/Manuals/software/KeynoteUserGuide.PDF on May 8, 2008, 100 pages.
Wempen, "PowerPoint® 2003 Bible," 2003, Wiley Publishing, Inc., Indianapolis, Indiana, pp. 145-148, 161-168.

* cited by examiner

*Primary Examiner*—X. L Bautista
(74) *Attorney, Agent, or Firm*—Fish & Richardson P.C.

(57) ABSTRACT

A system and method allows a user to specify a presentation by arranging content into a hierarchical arrangement. The presentation is generated in response to the content and the hierarchical arrangement.

24 Claims, 6 Drawing Sheets

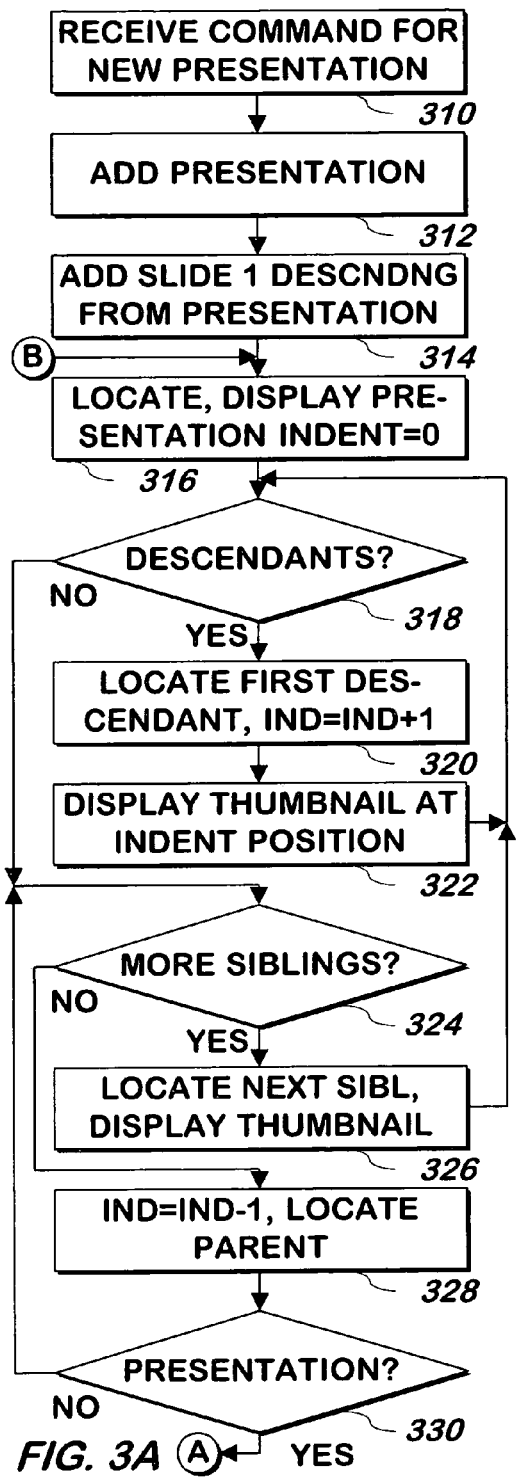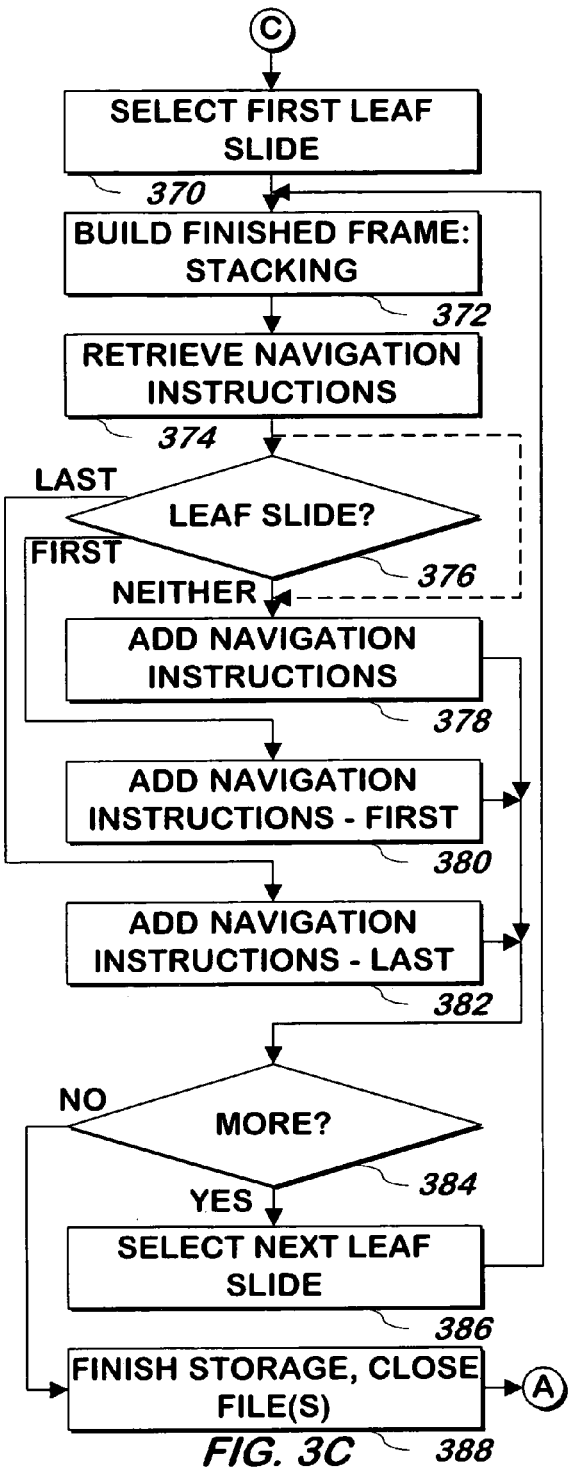
FIG. 3A
FIG. 3C

SYSTEM AND METHOD FOR GENERATING PRESENTATIONS

CROSS REFERENCE TO RELATED APPLICATION

This application claims the benefit of U.S. Provisional Patent Application Ser. No. 60/604,670, entitled, "Method and Apparatus for Generating Presentations" filed by Edward Skwarecki, Bob Pappas and Ken Ecky, on Aug. 25, 2004, having the same assignee as the present application, and is hereby incorporated by reference in its entirety.

FIELD OF THE INVENTION

The present invention is related to computer software and more specifically to application computer software for generating presentations.

BACKGROUND OF THE INVENTION

Presentations such as slide presentations may be generated by a computer system using a variety of user interfaces. A slide presentation may be generated by allowing the user to author individual slides, to be played back under control of a user interface that allows the user to move from one slide to the next.

Conventional user interfaces for preparing slide presentations can be cumbersome to use. For example, the Microsoft Powerpoint product employs a set of thumbnail images of each slide that the user scrolls through to find a slide. If there are many slides in the file, the user can spend a large amount of time scrolling through the slides. Apple's Keynote product allows the user to group slides, and then show thumbnail images of the first slide in each group, hiding the others, but this approach requires the user to manually move each slide after it has been created, a cumbersome task for slide presentations with large numbers of slides.

Conventional user interfaces do not allow the user much flexibility with information that is to be repeated from one slide to the next. Some conventional programs allow the user to define one or more "master" slides and assign each slide in the presentation to any one of the master slides. The information on the master slide is then displayed as a part of all of the slides that use that master slide, but they do not employ multiple levels of mastering. For example, if the author of the slide presentation has ten groups of ten slides each, and the user wants to put a corporate logo on every slide, and use a title of the group on every slide, the user must create ten master slides with the logo on each slide and the title of a different group on every master. If the corporate logo changes, the logo must be updated on each of the ten master slides.

Assignment of each slide to its master slide is also cumbersome. If a user wishes to change the assignment of five slides from one master to another, the user is required to locate each of the slides and then individually assign each slide to the new master through a cumbersome user interface. Furthermore, there is no way to quickly visually scan a group of slides to identify the master slide assigned to each one.

Conventional slide presentation authoring software does not allow the user great latitude to customize the playback user interface to suit the user's needs. The user is required to use the playback user interface designed by the authoring software.

Conventional slide presentations generate large files that can be time consuming to share over network connections such as the Internet.

What is needed is a system and method for generating slide presentations that can show and hide groups of thumbnail images corresponding to the slides without manual assignment of every slide after it has been created, provides flexibility for assignment of information that is repeated across multiple slides, allows rapid assignment and rearrangement of slides to master slides, can allow the user to quickly view the master slide or slides assigned to a slide, can allow the user to customize the playback user interface of the slide presentation, and can generate compact files to represent the presentations.

SUMMARY OF INVENTION

A system and method allows a user to author a slide presentation by specifying a hierarchical arrangement of content, with slides descending from one or more levels of other slides, and then the system and method generates a presentation based on the content of each slide and the hierarchical arrangement. The hierarchy of content is displayed graphically using thumbnail images of the content to allow a user to view large portions of the content in a short amount of time and to select such content for editing. Thumbnails of slides descending from other slides can be hidden from view, more compactly displaying the arrangement of slides in the hierarchy. Slides can be rendered from not only the content of leaf nodes in the hierarchy, but also from the content of all of the nodes from which they descend, allowing slides to share content in a flexible fashion by having their corresponding leaf nodes in the hierarchy descend from a common node. The user can use the system and method to rearrange the order of the slides in the presentation and the nodes from which leaf nodes corresponding to slides descend by dragging the graphical representation of the nodes in the hierarchical display. The user can use the hierarchical display to add or delete leaf nodes corresponding to slides or other nodes containing content that can be shared across multiple slides. The system and method generates user interface controls allowing the user to move from slide to slide and transition effects as slides enter or leave the presentation, but through a user-changeable mechanism that can either be left as provided for ease of use, or customized to suit the user's needs. The user can add additional functionality to any slide in the presentation.

DETAILED DESCRIPTION OF A PREFERRED EMBODIMENT

Figure 1:
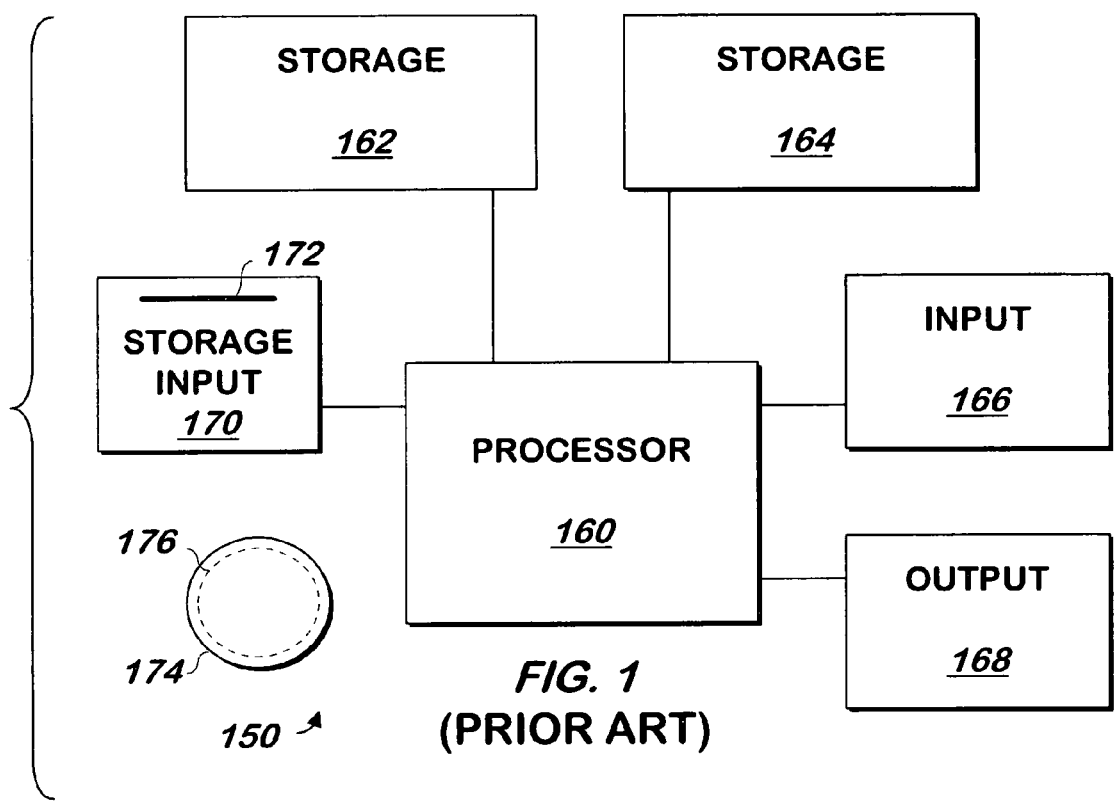
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions., data or both to configure the computer system 150 to operate as described below.

In one embodiment, each computer system 150 is a conventional SUN MICROSYSTEMS ULTRA 10 workstation running the SOLARIS operating system commercially available from SUN MICROSYSTEMS, Inc. of Mountain View, Calif., a PENTIUM-compatible personal computer system such as are available from DELL COMPUTER CORPORATION of Round Rock, Texas running a version of the WINDOWS operating system (such as 95, 98, Me, XP, NT or 2000) commercially available from MICROSOFT Corporation of Redmond Washington or a Macintosh computer system running the MACOS or OPENSTEP operating system commercially available from APPLE COMPUTER CORPORATION of Cupertino, Calif. and the NETSCAPE browser commercially available from NETSCAPE COMMUNICATIONS CORPORATION of Mountain View, California or INTERNET EXPLORER browser commercially available from MICROSOFT above, although other systems may be used.

In one embodiment, the user authors a presentation on development system 202. In one embodiment, all network communication into or out of system 202 is made via input/output 206 of communication interface 210 which is coupled to network 260 such as the Internet or a local area network or both. Communication interface 210 is a conventional communication interface that supports TCP/I-P or other conventional communication protocols. Communication interface also contains suitable interfaces to a keyboard, mouse, monitor or other input/output devices via input/output 208.

User Initializes a Presentation

A user may use a user interface provided by command manager 220 via operating system 256 and communication interface 210 to request to generate a new slide presentation. When command manager 220 receives the request from the user via operating system 256, command manager 220 signals slide information initiator 222. When slide information initiator 222 receives the signal from command manager 220, slide information initiator 222 sets up an initial slide presentation data structure, which may include a root level presentation slide and an initial first level slide which may descend from the overall presentation slide as will now be described.

To set up the initial slide presentation data structure, slide information initiator 222 builds a record in slide information storage 226 corresponding to each slide to be displayed in the initial slide presentation interface. Slide records for each of two slides are initially built. One of the two slides is a presentation slide, a slide from which all other slides in the presentation descend in a hierarchical fashion, described in more detail below. In one embodiment, the presentation slide is a slide like any other, with content that may be modified by the user, and in another embodiment, the presentation slide contains no content or contains only predetermined content. The other slide is a slide that may be supplied with content by a user. The content of any slide descending from the presentation slide (and optionally, the presentation slide) may include graphics, text, audio, video, or animation information. Slide information storage 226 may be disk or memory storage or both. The information in slide information storage 226 may be arranged as a list of slide records where each slide record on the list is associated with one or more portions of the presentation being generated by development system 202.

In one embodiment, slide information initiator 222 builds a slide record associated with the presentation slide and another slide record associated with slide 1 in slide information storage 226. The record for each slide in slide information storage 226 may contain a unique identifier of the record, a label for the slide (e.g. "Presentation" for the presentation slide, or "Slide N" for the other slides), the hierarchical level of the slide ("0" for the presentation slide, "1" for slide 1), a pointer to the parent slide and any child slides of the slide (as set up by slide information initiator 222, the presentation slide has no parent slides and points to the slide record for slide 1 as the child slide, and slide 1 points to the slide record of the presentation slide as its parent, and has no child slides), and also contains a pointer to the content of the slide (the content for any record being empty when its slide record is initialized). In one embodiment, if a slide has multiple child slides, the pointers to the child slides are arranged in the order in which the child slides should be arranged, as described in more detail below.

In one embodiment, a data component exists for each slide record on the list in slide information storage 226 that indicates whether a slide is selected. When slide information initiator 222 has built the record associated with the presentation slide and with slide 1 in slide information storage 226, slide information initiator 222 then marks the slide 1 record as selected. When slide information initiator 222 has built the records associated with the initial slides in slide information storage 226 as described above, slide information initiator 222 signals slide display manager 230.

Displaying the Content and Hierarchy of Slides

Figure 4:
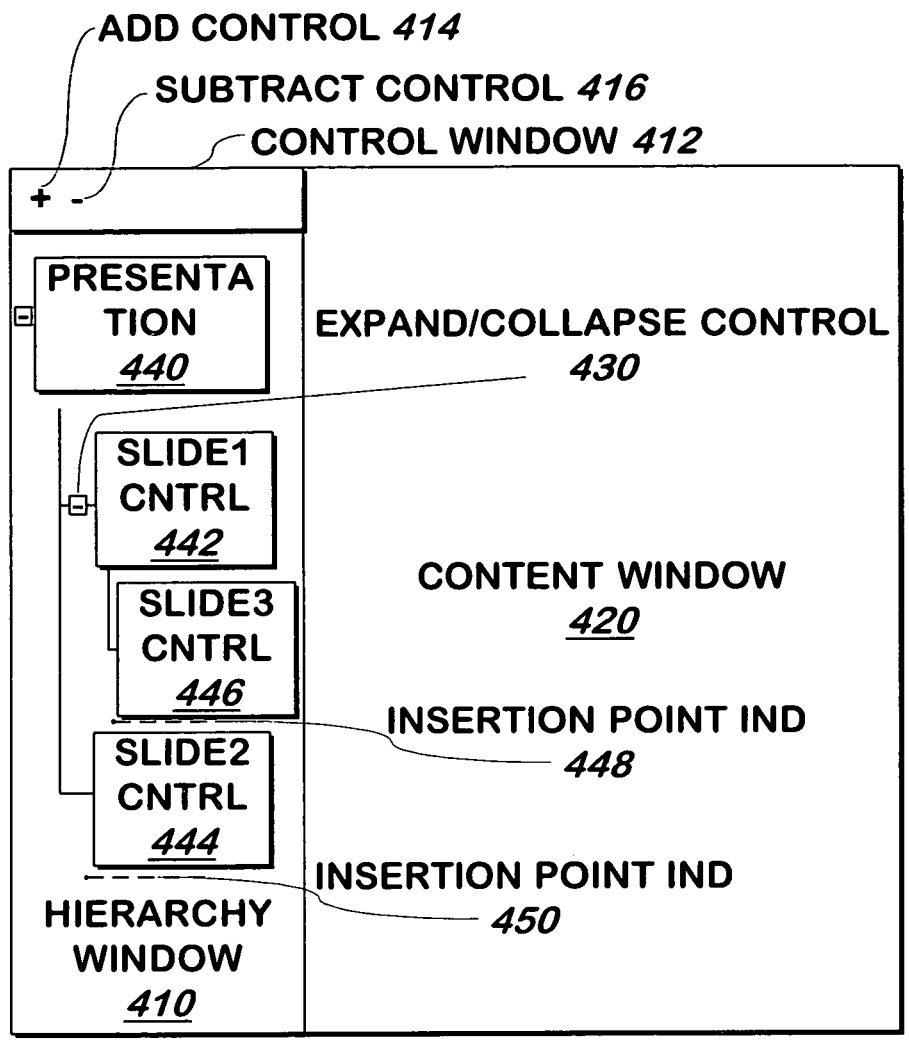
FIG. 4 is a diagram of a portion of a screen used for generating presentations according to one embodiment of the present invention.

FIG. 4 illustrates a representative user interface according to one embodiment of the present invention. Referring momentarily to FIG. 4, in one embodiment, each of several of the slides is displayed in a user interface that displays an indication the hierarchy of the slides in a hierarchy window 410. The user interface additionally displays the content of the slide marked as selected in a content window 420.

Figures 2, 2A:
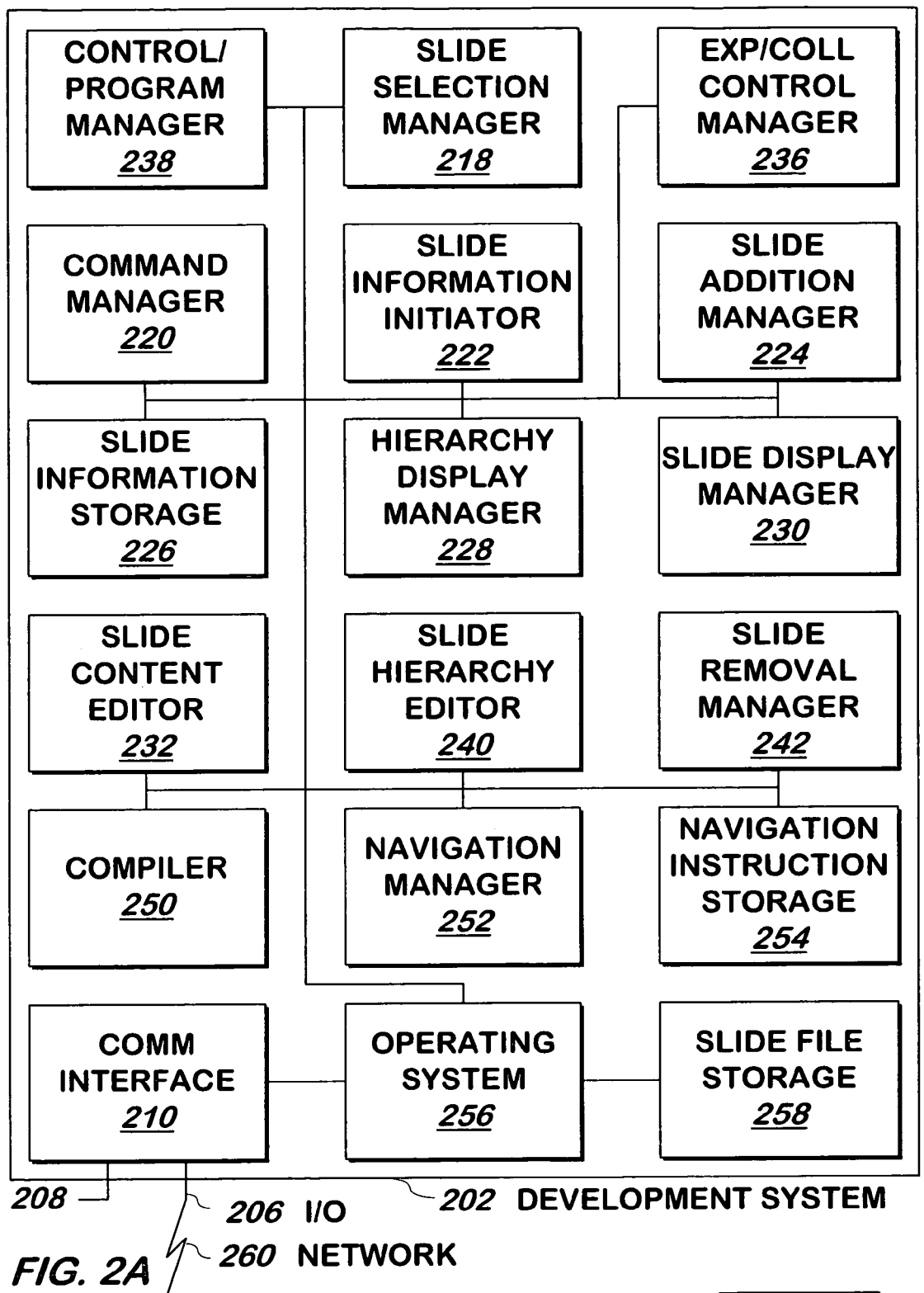
FIG. 2, consisting of FIGS. 2A and 2B, is a block schematic diagram of a system for generating and displaying presentations according to one embodiment of the present invention.

Referring now to FIGS. 2 and 4, when slide display manager 230 receives the signal from an entity, in this case, slide information initiator 222, slide display manager 230 proceeds to read the information in slide information storage 226 and display in slide window 420 the slide contents of the selected slide record as will now be described. Slide display manager 230 reads the information in slide information storage 226. In one embodiment, slide display manager 230 searches the records on the list in slide information storage 226 for the slide that is marked as selected using conventional methods. When slide display manager 230 has determined which slide is selected as described above, slide display manager 230 follows the pointer to the contents for that slide record and retrieves the slide contents associated with the selected slide record and renders and displays the slide contents in content window 420 via operating system 256 and communication interface 210 using conventional methods. At this point, the selected slide is slide 1 as described above and consists of blank slide contents.

In one embodiment, slide display manager 210 also displays in content window the content from all of the slide records from which the selected slide record descends. Slide display manager 230 renders the contents by traversing pointers of the parent of each slide record from which the selected slide record corresponds and building a list of pointers to the content of each such slide record in the order of their descent. Starting with the contents of the presentation slide record, slide display manager 230 renders the contents corresponding to each of the pointers to content the list in the order in which the slide records corresponding to the content descend from one another in the hierarchy of slide records, with the content of slide records closer to the presentation slide record overlapping the content of slide records further away from the presentation slide record, using conventional rendering techniques, taking into account any opacity of the contents of any slide. Such a display arrangement is referred to herein as a stacking of slides. The stacking of slides can be performed in the order described herein or in the opposite order.

In one embodiment, as slide display manager 230 renders the content of all but the selected slide, slide display manager 230 grays out the contents, substituting a grayer version of the color for the color indicated by the content, or otherwise displaying differently the content of the selected slide from the content from other slide records being displayed so that the user can tell the difference in content from the selected slide from the content of the slides from which the selected slide descends.

In one embodiment, the user can employ command manager 220 to cause slide display manager 230 to display in the content window content from all child slide records of the selected slide in addition to the content of the selected slide record, and either in addition to, or instead of the content of the slide records from which the selected slide record descends. When command manager 220 receives such a command from the user, it signals slide display manager 230, which displays the contents of all child slide records of the parent slide record, allowing the user to ensure that the content of the selected slide record is properly aligned with all of its child slide records. In one embodiment, the content from child slide records are displayed stacked above the content of all slide records from which they descend, and in another embodiment, they are displayed stacked above the content of all such slide records except the content of the selected slide record, which is stacked on top of all of the content of the other slide records having content displayed as described herein. In one embodiment, slide display manager grays out the contents of all of the child slides of the selected Using the contents of each slide record, when slide display manager 230 is initially signaled for a new file or for an existing file, it reads each of the slide records in slide information storage 226, and for each such record, renders a smaller, less detailed, image, referred to as a "thumbnail" of the contents of just that slide record, stores a bitmap of the thumbnail in another storage area in slide information storage 226, and stores in the slide record a pointer to the area in which the thumbnail is stored for use as described below. In one embodiment, this process is performed as a background process having a relatively low priority, so as not to require the user to wait for the rendering of all of the thumbnails.

Additionally, each time slide display manager 230 is signaled as described herein, it renders a thumbnail of the contents of the selected slide record. When slide display manager 230 has completed the operations described above, slide display manager 230 signals hierarchy display manager 228.

When signaled, hierarchy display manager 228 reads the information in slide information storage 226 and displays a hierarchy of slide controls in hierarchy display window 410, one slide control for each slide record stored in slide information storage 226, as will now be described. Hierarchy display manager 228 reads the information on the list of slide records in slide information storage 226 and displays slide controls 440-444 in a manner that illustrates their arrangement in the hierarchy. In this case, where hierarchy display manager 228 is displaying hierarchy window 310 of the initial slide presentation interface, hierarchy display manager 228 displays presentation slide 1 control 440 at the top of hierarchy window 410 and displays slide control 442 such using a visual indication that indicates that slide 1 descends from the presentation slide. The other slide controls 444-446 shown in FIG. 4 may be added in at a later time.

In one embodiment, hierarchy display manager 228 displays slide controls in the hierarchy window 410 at different levels of the hierarchy indented from the left margin to indicate their level in the hierarchy: the farther the level is from the root level, the more indented from the left margin each slide control is displayed. Slide controls are displayed by hierarchy display manager 228 descending from the slide control of their parent slide record by displaying all slide controls corresponding to a slide record descending from a parent slide record underneath the slide control of the parent slide, to the right of a horizontal line that connects or nearly connects to a vertical line that extends underneath the parent slide control. Hierarchy display manager 228 displays child slide controls in the order in which they are pointed to by their parent slide record, with the first child slide control directly underneath the parent slide, and with no slide controls for slide records that are on the same hierarchical level as the parent slide record displayed between a slide control for a slide record and the slide control for its parent slide record.

Each slide control is represented in the hierarchy window 410 by hierarchy display manager 228 using an outline of the slide control displayed near its label. Additionally, hierarchy display manager 228 displays the thumbnail image pointed to by the slide record corresponding to the slide control in the outline of the slide control.

As noted above, the slide record of a slide control may be selected, and hierarchy display manager 228 initially displays the slide control for a newly selected slide record in the hierarchy window 410. In one embodiment, hierarchy display manager 228 displays the slide control associated with the selected slide record in a manner that denotes the slide control as corresponding to the selected slide, for example by highlighting it, such as by displaying it over a background that is different from the background on which the other slide controls are displayed in hierarchy window 410. In one embodiment, hierarchy display manager 228 displays each slide control 440-444 at a location indicated by the top and bottom edge assigned to its corresponding slide record, initially assigned to the presentation slide record and the slide 1 slide record by slide information initiator 222. For example, in FIG. 4, the presentation slide record is initially assigned a top edge of "0" and a bottom edge of "30", and the slide 1 slide record is initially assigned a top edge of "40" and a bottom edge of "69", by slide information initiator 222.

In one embodiment, each slide control 440-444 has a fixed size and means of indication. In another embodiment, each slide control has a size selectable by the user via command manager 220, which provides a user interface allowing the user to change the size of each slide control and stores the size of each of the slide controls in slide information storage 226. This information is used as described herein to calculate the edges for each of the slide records, and when changed, command manager 220 recalculates each of the edges for each of the slide controls in accordance with the size selected by the user.

In one embodiment, if the user selects an option via command manager 220 to display slide indicators using text, command manager 220 stores an indication of this option in slide information storage 226. When the indication is on, hierarchy display manager 228 displays a single line of text as slide indicators instead of outlines containing thumbnails as shown in the Figure. The text may be the label or text from the content of the slide record, such as the first 20 characters of text that would be displayed at the top of the displayed content of the slide record to which the slide indicator corresponds. The entities adding slide records or adjusting their edges as described herein check the indication in slide information storage 226 and calculate edges in accordance with whether the indicator is on or off. When the user turns this option on or off, command manager 220 adjusts the indicator accordingly and the adjusts the edges of the slide records to account for their lesser height. Such an embodiment allows the hierarchy display manager 228 to display more slide indicators on a given amount of screen space.

In one embodiment, the user can use expand/collapse controls, such as expand collapse control 430 to show or hide child slide indicators 446 of the slide indicator 442 corresponding to the control 430. Each slide record has an indicator that indicates whether the corresponding slide control 440-444 should be displayed expanded or collapsed. When a new slide record is added to slide information storage 226 as described herein, such indicator is initialized to indicate that the slide control should be displayed expanded.

If a slide record contains child slides, hierarchy display manager 228 displays an expand/collapse control 430 a set number of pixels to the left of the center of the slide indicator for that slide record. If the indicator in the slide record indicates that the slide control 440-444 should be displayed expanded, hierarchy display manager 228 displays a minus sign "−" in the expand/collapse control 430 and otherwise displays a plus sign "+" in the expand/collapse control 430. (There is an additional expand/collapse control next to presentation slide control 440 that is unlabeled to avoid cluttering the Figure.)

A slide control 440-444 corresponding to a slide record descending from a slide record having an indicator indicating that its corresponding slide record should be displayed collapsed is not displayed and a slide control 440-444 corresponding to a slide record descending from a slide record having an indicator indicating that its corresponding slide record should be displayed expanded is displayed. As noted herein, each slide record is marked with an indication as to whether its corresponding slide control should be displayed, and slides record marked with an indication that its slide control should not be displayed is not displayed by hierarchy display manager 228 and otherwise the corresponding slide control is displayed as described herein.

If the slide indicators 440-444 do not fully fit on the hierarchy window 410, hierarchy display manager 228 displays one or two scroll bars along the right edge, bottom edge or both of the hierarchy window 410, and maintains top and bottom boundaries, and right and left boundaries, indicating, in the coordinate system of the slide records, which slide indicators 440-444 should be displayed in the hierarchy window 410 as well as their positions in that window. For example, the top boundary for the hierarchy window 410 shown in FIG. 4 may be "−5" to indicate that the presentation slide, with its top edge at "0" is to be displayed 5 pixels from the top edge of the hierarchy window 410.

Hierarchy display manager 228 displays the slide controls in accordance with their edges, levels and the boundaries of the hierarchy window 410. If the user moves the scroll control, hierarchy display manager 228 is notified by command manager 220, and adjusts the boundaries of the hierarchy window 410 in accordance with the user's movements of the scroll bars.

In one embodiment, the boundaries of the hierarchy window are stored in slide information storage 226. The screen coordinates of top left corner and bottom right corner of the hierarchy window 410 are maintained in slide information storage 226 by command manager 220. If the user moves or resizes the window containing the hierarchy window, command manager 220 requests the coordinates of the opposite corners of this outer window and adjusts the screen coordinates of the corners of the hierarchy window 410 in slide information storage 226. Command manager 220 then signals hierarchy display manager 228, which recalculates the boundaries of the hierarchy window 410 using its size determined from the screen coordinates of the upper left hand and bottom right hand corner and, using the boundaries, redisplays the slide controls 440 in accordance with the boundaries, their edges and their level.

The User Modifies the Contents of the Selected Slide

At any time, the user may modify the contents of the selected slide record. Slide content editor 232 provides a conventional graphical user interface that allows the user to add, delete and modify the contents of the selected slide record in the manner of conventional graphics programs, such as the Flash authoring program commercially available from Macromedia, Inc., of San Francisco, Calif. Slide content editor 232 stores at least the graphics (and optionally the text) for each slide record as conventional vector graphics so that the file size can be kept smaller than if bitmapped graphics were used. As the user makes changes to the contents of the selected slide record, slide content editor 232 signals slide display manager 230, which renders the contents of the slide and displays them in the content window 320. Additionally, each time a change is made to the selected slide, slide display manager 230 rerenders the thumbnail of the slide, stores a bitmap of the thumbnail in a storage area pointed to by the slide record, and signals hierarchy display manager 228. When so signaled, hierarchy display manager 228 renders the thumbnail in the slide control if the slide control is still being displayed in the hierarchy window (and has not been scrolled off by the user).

In one embodiment, the contents of each slide are stored as a conventional Flash movie clip, containing static images, or a sequence of animated images and may contain sound.

User Adds Slide Record with Button or Right Click/Insert Screen

In one embodiment, the user may add a slide record corresponding to the presentation using one of two methods. One method may be to add a slide by clicking on add control 414 in control window 412, and the other method is if the user clicks on add control 414, command manager 220 from operating system 256 receives an indication that the user has done so and signals slide addition manager 224. When slide addition manager 224 receives the signal from command manager 220, slide addition manager 224 builds a slide record in slide information storage 226 associated with the newly added slide in the same manner as was described above for slide information initiator 222.

In one embodiment, the label text of each newly added slide record to the presentation denotes the sequence in which the slides were added. In the instance where the user is adding a slide record to the initial slide presentation, slide addition manager 224 assigns to the slide record the label text of "slide 2".

Slide addition manager 224 also indicates the parent slide record of the newly added slide record in slide information storage 226. In one embodiment, when a user uses add control 314 to add a slide, the parent of that added slide is the presentation slide. In such embodiment, slide addition manager 224 adds a pointer to the newly added slide record to the end of the list of child slide records of the presentation slide record, and adds a pointer to the presentation slide record as the parent slide-record of the newly added slide record.

In another embodiment, the parent slide record of a newly added slide record is the parent slide of the slide which was marked as selected when the user clicked add control 314 to add a slide to the presentation. In such embodiment, slide addition manager 224 locates the slide record marked as selected, identifies its parent slide record using the pointer thereto, and adds the identifier of the newly added slide record as the child of the parent slide record so identified. Slide addition manager 224 adds the pointer to the newly added record from its parent in the list of child slide records immediately following the selected slide record, (with any pointers to other child slide records that follow the selected record in the list of pointers to child slide records being moved down one entry in the list). Slide addition manager 224 adds a pointer to the identified parent slide record as the parent slide of the newly added slide record.

Slide addition manager 224 adds the hierarchical level of the slide to the slide record, and marks the newly added slide as selected in the corresponding record when slide addition manager 224 builds the record in slide information storage 226. To do so, slide addition manager 224 searches for the record already marked as selected, removes the selected indication from that record (if not already located as described above), and marks the newly added slide record as selected. In one embodiment, slide addition manager 224 or any other entity that changes the selected slide record also stores in a separate record in slide information storage 226 an indication of which record was the selected slide record prior to the currently selected slide record.

Slide addition manager 224 adds the top and bottom edges to the newly added slide record so that its corresponding slide control will be displayed as the last child slide record of its parent. When slide addition manager 224 finishes building the record associated with the newly added slide as described above, slide addition manager 224 signals slide display manager 230. Slide display manager 230 operates as described above, and signals hierarchy display manager 228.

When hierarchy display manager 228 receives the signal, hierarchy display manager 228 reads the information in slide information storage 226 as described above and displays the slide controls corresponding to the records in slide information storage 226 in hierarchy window 310 as described above. The slide controls may be displayed by hierarchy display manager 228 with the corresponding thumbnail images of the slide contents as described above.

User Selects a Slide

At any time, the user may select any slide descending from the presentation slide in the hierarchy. When the user selects a slide by clicking on the corresponding slide control with the mouse in hierarchy window 410, command manager 220 signals slide selection manager 218 with the coordinates of the mouse cursor when it was clicked, relative to the upper left hand corner of the hierarchy window 310.

When slide selection manager 218 receives the signal from command manager 220, slide selection manager 218 determines on which slide control in hierarchy window 310 the user clicked.

As noted herein, when a slide record is added to, or moved within the hierarchy as described herein, the edges of the slide control in the hierarchy window are computed based on where that slide will be displayed in the hierarchy window. The edges correspond to the top and bottom of the slide control, on an axis on which the top of the presentation slide is considered to be zero. For example, if each slide is 31 pixels high, the presentation slide's edges are 0 and 30. If slide 1 is spaced 10 pixels from the presentation slide, its edges are at 40 and 69.

To determine on which slide control a user clicked, slide selection manager 218 adds a correction amount to the Y coordinate of the mouse cursor coordinates received from command manager 220 to correct for the coordinate corresponding to the top of the hierarchy window to obtain an adjusted Y coordinate in the coordinate system of the slide controls for the mouse click, and then locates the slide record corresponding to that Y coordinate. In one embodiment, a slide record corresponding to a mouse click in the hierarchy window is the slide record for which the edges are on either side of the adjusted Y coordinate or, if no such slide record exists, the slide record with the nearest edge to that adjusted Y coordinate within a threshold amount. In one embodiment, the X coordinate of the mouse received from command manager 220 must be within a range of coordinates corresponding to the level of the slide record to which the y coordinate corresponds in order to be considered selected by slide selection manager 218.

Once slide selection manager 218 has determined on which slide control the user clicked, slide selection manager 218 searches slide information storage 226 for the currently selected slide record and removes the selected indication from the slide record. Slide selection manager 218 stores the indication of which slide record was the previously selected slide record in the corresponding record in slide information storage 226 described above. Slide selection manager 218 then marks the user-indicated slide record as the selected slide.

The user may also select a slide control using the up-arrow and down-arrow keys. If the user presses either key after clicking in the hierarchy window 410 or control window 412, slide selection manager 218 locates the slide record having a lower edge nearest the top edge of the selected slide record (up-arrow) or upper edge nearest the lower edge of the selected record and marks such slide record as the selected slide record, unmarks the formerly selected slide record and stores a pointer to such slide record as the next most recently selected slide record in slide information storage 226. If the selected slide record is partially or fully outside the boundaries of the hierarchy window, slide selection manager 218 alters the boundaries to include the upper and lower edges of the newly selected slide record.

When slide selection manager 218 has marked the user-indicated slide record as the selected slide, slide selection manager 218 signals slide display manager 230 which proceeds as described above. The user may then perform any of the actions described herein.

It is noted that the user may select the presentation slide instead of the others and can select multiple slides, either by selecting the first slide by clicking it and then shift clicking the last slide, with the first and last and all slides between them selected as a result, or by control-clicking individual slides to select those slides. Actions described herein may then be performed on multiple slides at the same time.

The User Selects Expand/Collapse Control At any time, the user may select an expand collapse control. As noted herein, when the user clicks in the hierarchy window 410, slide selection manager 218 receives information regarding the location of the mouse when the user clicked it. If the user clicks within the edges of the slide record, and the click is a threshold amount within each edge towards its center, but at a location on the X-coordinate where the expand/collapse control would be displayed relative to the slide control at the level indicated by the slide record, slide selection manager 218 identifies the slide record in the manner described above and provides a pointer to the corresponding slide record to expand collapse control manager 236.

Expand collapse control manager 236 receives the pointer and determines if the slide record has any child slide records. If not, expand collapse control manager 236 ignores the pointer and the user may perform any of the actions described herein.

If the slide record has at least one pointer to a child slide record, expand collapse control manager 236 alters the indication in the slide record that indicates whether the corresponding slide control should be displayed expanded or collapsed to the opposite of its current value.

Expand collapse control manager 236 then determines the value of the indicator it just altered. If the value indicates that the corresponding slide record should be displayed expanded, expand collapse control manager 236 follows the pointers to each slide record descending from the slide record having the pointer received from slide selection manager 218 and indicates that the slide record should be displayed. Expand collapse control manager 236 calculates the edges of each such record and recalculates the edges of the slide records that were displayed below the slide record corresponding to the pointer received by expand collapse control manager 236 as described herein.

If the value indicates that the corresponding slide record should be displayed collapsed, expand collapse control manager 236 follows the pointers to each slide record descending from the slide record having the pointer received from slide selection manager 218 and indicates that the slide record should not be displayed. Expand collapse control manager 236 recalculates the edges of the slide records that were displayed below the lowest-displayed slide record descending from the slide record corresponding to the pointer received by expand collapse control manager 236 as described herein.

As other entities described herein calculate the edges of slide records, they ignore the presence of slide records indicated as not to be displayed.

When expand collapse control manager 236 has completed altering the slide records as described above, expand collapse control manager 236 signals hierarchy display manager 228, which redisplays the slide controls 440-444 and other information in the hierarchy window 410.

The User Adds a Slide Descending from the Current Slide

At any time, the user may choose to add a slide record to be added descending from the currently selected slide record. To indicate this desire, the user first selects a slide record as described above. Once the user has selected a slide record, the user signals to add a nested slide using a user interface provided by command manager 220. In one embodiment, the user interface may be a menu of commands, which may be displayed to the user by command manager 220 when the user clicks the right mouse button while the mouse is over the hierarchy window 410. When command manager 220 receives the indication from the user to add a nested slide, command manager 220 signals slide addition manager 224 to insert a slide record as a nested slide.

Slide addition manager 224 receives the signal to add a nested slide record from command manager 220 and builds the new record in slide information storage 226 as described above and adds the new slide as descending from the selected slide at the end of the list of child slides of the selected slide in the manner described above. Slide addition manager 224 then marks the new slide record as the selected slide in the associated record in slide information storage 226 as described above. Other ways of adding a slide may be employed, such as by pressing the enter key when a slide is selected, with the added slide being added just under the selected slide, and descending from the same parent as the selected slide.

When slide addition manager 224 has completed building the new slide record as described above, slide addition manager 224 recalculates the top and bottom edges of the slide controls to be displayed in hierarchy window 310 by hierarchy display manager 228 below the newly added nested slide, and stores their edges in their corresponding slide records. For example, if the user added slide 3 in this fashion after adding slide 2, the slide control 444 for slide 2 would be moved down as shown in FIG. 4, by changing the top and bottom edges of the corresponding slide record. When-slide addition manager 224 has calculated the new edges, slide addition manager 224 signals slide display manager 230, which operates as described above.

When hierarchy display manager 228 receives the signal from slide display manager 230, hierarchy display manager 228 displays hierarchy window 410 with the slide-control corresponding to the newly added nested slide as described above. Because the newly-added slide was added descending from another slide and at the end of the list of slides descending from the parent, hierarchy display manager 228 displays the slide control of the newly added nested slide indented, and below the slide control of the parent slide of the nested slide, and positioned such that the slide controls corresponding to all other existing slides descending from the same parent slide are displayed above the slide control of the newly added nested slide in hierarchy window 410 by hierarchy display manager 228.

The user modifies position of slide in hierarchy At any time, the user may modify the order or hierarchical position of the slide records in the presentation by changing the position of the corresponding slide control in hierarchy window 410. To do so, the user first selects a slide control in hierarchy window 410 which causes command manager 220 and slide selection manager 218 to perform the actions described above. The user then drags the selected slide control and relocates the selected slide control up or down in a new position in hierarchy window 410. As the user is dragging the selected slide control, command manager 220 is signaled by operating system 256, and the system responds as will now be described.

Command manager 220 receives notification from the operating system that the user has dragged the mouse to a new position and, using coordinates of the hierarchy window 410 that it maintains and the screen coordinates of the mouse as it is being dragged, command manager 220 determines that the drag is being performed in the hierarchy window 410. As the user drags the mouse in the hierarchy window 410, command manager 220 subtracts the X and Y coordinates of the upper left hand corner of the hierarchy window 410 from the screen coordinates received from the operating system and provides the resulting coordinates to slide hierarchy editor 230. Slide hierarchy editor 230 adjusts the X-and Y- coordinates it receives by adding an offset corresponding to the coordinate system used by the slide records to display the slide controls that correspond to the upper left hand corner of the hierarchy window 410. This resulting X- and Y- coordinate is the position of the cursor in the coordinate system of the slide controls 440-444.

Slide hierarchy editor 230 then signals hierarchy display manager 228, which displays hierarchy window 310 and its contents as described above. However, slide hierarchy editor 230 also displays in the hierarchy window 410 an insertion point indicator that indicates the new position in the hierarchy of slide records the selected slide record would have were the user to release mouse button being used to drag the slide control at that particular moment.

Slide hierarchy editor 230 determines the location at which it should display the insertion point indicator by identifying the slide nearest the mouse cursor using the Y coordinate of the mouse calculated as described above and the edges of the slide controls stored in slide information storage. If the mouse cursor is above the vertical center of the nearest slide, slide hierarchy editor 230 displays the insertion point indicator as a horizontal line extending towards the right, from the vertical line adjacent to the nearest slide control at a location approximately ⅓ of the distance used to space slide controls above one another, from the nearest slide, indicating that if the user releases the mouse cursor at that location, the slide will be at the same hierarchical level as the slide control above which it is positioned. The horizontal line thus is in the relative side to side position of the horizontal line that will connect between the dragged slide control and the vertical line adjacent to the nearest slide control to the mouse cursor, though, if the user released the mouse, the horizontal line would end up being displayed lower on the screen than the indicator, so that the dragged slide control could be positioned above the nearest control and below the slide control displayed above the nearest slide control, with the nearest slide control, and some or all slide controls displayed below the nearest slide control, moved down.

If the mouse cursor is below the nearest slide, slide hierarchy editor 230 determines whether the value of the X coordinate of the mouse cursor it receives is less than a threshold. In one embodiment, the threshold is the left edge of a text label displayed to the right of the slide. If the X-coordinate is less than the threshold, slide hierarchy editor 230 displays the insertion point indicator as a horizontal line extending towards the right, from the vertical-line adjacent to the nearest slide control, at a location approximately ⅓ of the distance used to space slide controls above one another, from the nearest slide, indicating that if the user releases the mouse cursor at that location, the slide record corresponding to the dragged slide control will be at the same hierarchical level as the slide control below which it is positioned. The horizontal line thus is in the relative side to side position of the horizontal line that will connect between the dragged slide control and the vertical line adjacent to the nearest slide control to the mouse cursor. However, in actuality, if the user released the mouse, the horizontal line that actually connects the dragged slide control to that element would end up being displayed lower on the screen than the indicator (and having a right side that is truncated to meet the left edge of the slide control), so that the dragged slide control could be positioned below the nearest control and above the slide control displayed below the nearest slide control, with some or all of the slide controls displayed below the nearest slide control, moved down. Insertion point indicator 450 shown in FIG. 4 illustrates the insertion point indicator that would be displayed if the slide control for slide 3 were dragged down and the mouse cursor was closest, and underneath the slide control for slide 2, but the X coordinate of the mouse did not exceed the threshold.

If, however, the X coordinate received by slide hierarchy editor is above the threshold, slide hierarchy editor 230 displays the insertion point indicator as a horizontal line extending towards the right, from a vertical line that, if displayed, would represent a slide descending from the nearest slide control, at a location approximately ⅓ of the distance used to space slide controls above one another, from the nearest slide, indicating that if the user releases the mouse cursor at that location, the slide record corresponding to the dragged slide control will descend from the slide control below which it is positioned. The horizontal line thus is in the relative side to side position of the horizontal line that will connect between the dragged slide control and the vertical line descending from the nearest slide control. However, if the user actually released the mouse, the horizontal line that actually connects the dragged slide control to that element would end up being displayed lower on the screen than the indicator (and having a right side that is truncated to meet the left edge of the slide control), so that the dragged slide control could be positioned below the nearest control and above any slide control displayed below the nearest slide control, with some or all slide controls displayed below the nearest slide control, moved down. Insertion point indicator 448 shown in FIG. 4 illustrates the insertion point indicator that would be displayed if the slide control for slide 2 were dragged up and the mouse cursor was closest, and underneath the slide control for slide 3, and the X coordinate of the mouse exceeded the threshold. If the user released the mouse cursor, the slide record corresponding to the slide control 444, labeled slide 2, would descend from the slide record corresponding to the slide control 446, labeled slide 3.

Figures 3, 3B:
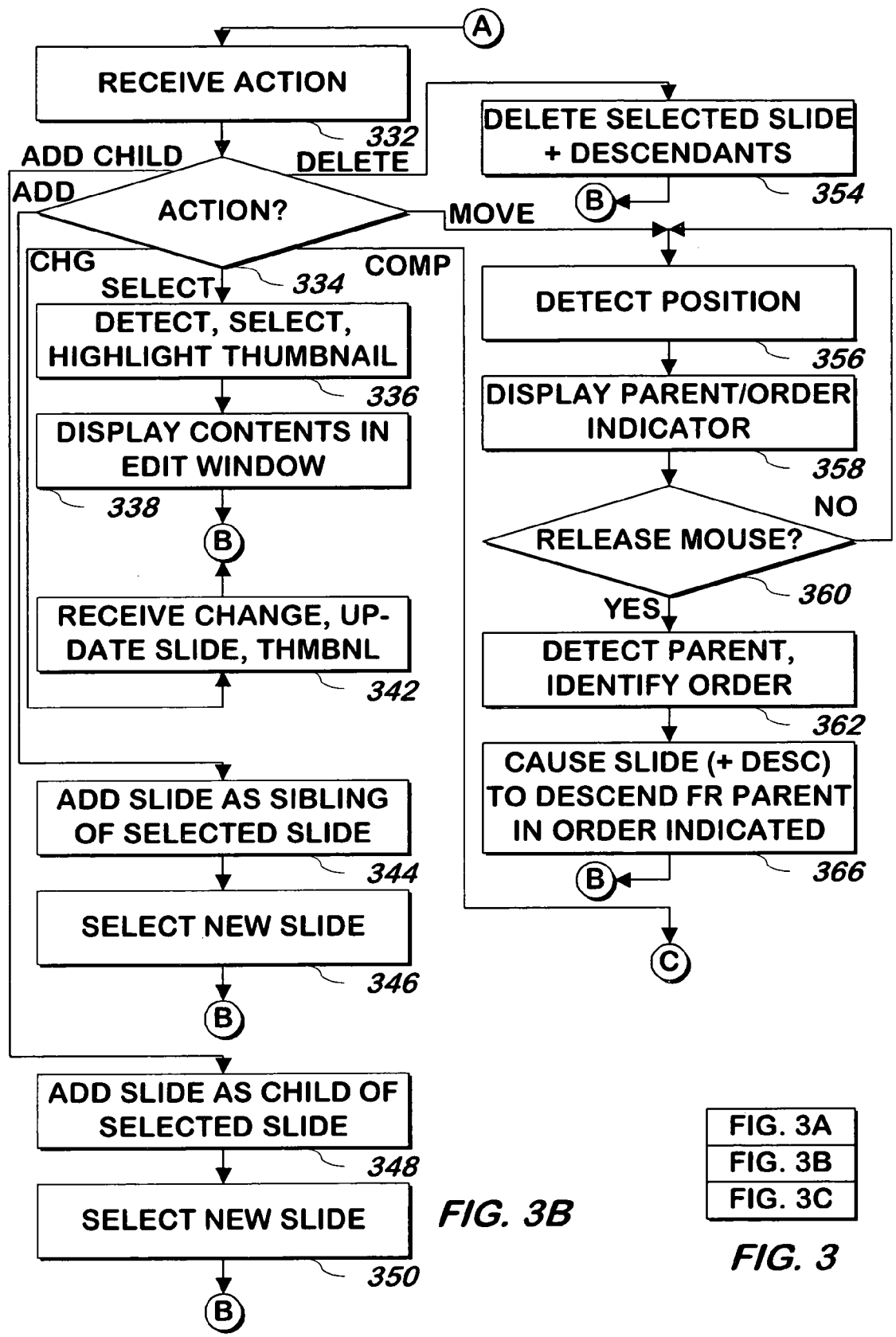
FIG. 3, consisting of FIGS. 3A, 3B, and 3C, is a flowchart illustrating a method of generating and displaying a presentation according to one embodiment of the present invention.

The insertion points 348, 350 in FIG. 3 are both displayed in the figure, however, only one insertion point indicator would be displayed at a given time in one embodiment. Additionally, the insertion point indicators 448, 450 are displayed as dashed lines, but, in one embodiment, they are displayed as solid lines, with a small, solid ball at the left side to indicate the level in the hierarchy at which the slide control will be placed if the user lets go of the mouse button.

If the user continues to move the mouse, the process described above will be repeated and the insertion point indicator displayed by slide hierarchy editor 240 may move in accordance with the mouse cursor position.

The threshold for the X coordinate may correspond to, or be a function of, the left side of the nearest slide control in one embodiment, the left or right side of text displayed near the slide control, or another threshold may be used in another embodiment.

When the user releases the mouse button used to drag the slide control, command manager 220 receives the coordinates of the mouse cursor and again converts them as described above and provides them to slide hierarchy editor 240. Slide hierarchy editor 240 identifies the level, parent of the selected slide control and order in which the selected slide control is placed relative to its sibling slide controls in accordance with the insertion point indicator and adjusts the selected slide record, and the slide records of its former and new parent slide records. .For example, if insertion point indicator 450 applies when the slide control 446 for slide 3 is selected and dragged, the pointer to the parent slide record for the slide record for slide 3 is changed from the slide record for slide 1 to the presentation slide record, and the descendants of the presentation slide record are altered to indicate that slide 1, slide 2 and slide 3 descend from the presentation slide record, in that order. The slide record for slide 1 is altered to indicate that it has no descendants. The hierarchical level of slide 3 is changed to be level 1. Slide hierarchy editor 340 makes these changes, recalculates the edges of the selected slide and the slides displayed underneath it, and signals slide display manager 230, which operates as described above.

User Deletes a Slide

At any time, the user may choose to delete a slide from the slide presentation. To do so, the user first selects the slide control in hierarchy window 310 corresponding to the slide that the user desires to remove as described above, which causes it to be selected by slide selection manager 218 as described above, and slide selection manager 218 signals slide display manager 230 as described above, causing the display of the newly selected slide and the hierarchy, and indicating the selection of the selected slide.

The user may then indicate the desire to remove the selected slide from the slide presentation using communication interface 210. The user may indicate a slide deletion by clicking on subtract control 416 in control window 412 or by utilizing the delete slide command in a menu provided by command manager 220 as described above or by pressing the delete key on the keyboard. When the user indicates the removal of a slide, command manager 220 receives the command from the user.

When command manager 220 receives the command from the user, command manager 220 signals slide removal manager 242. When slide removal manager 242 receives the signal from command manager 220, slide removal manager 242 proceeds to remove the selected slide from the slide presentation as will now be described. Slide removal manager 242 searches slide information storage 226 for the selected slide record. When slide removal manager 242 finds the selected slide record in slide information storage 226, slide removal manager 242 identifies its parent, and removes the reference from the parent to the selected slide record, moving up in the sibling order any sibling slide records that followed the selected slide record in the list of pointers to the child slide records in the parent slide record. Slide removal manager 242 then removes the selected slide record from slide information storage 226 using conventional techniques. In one embodiment, slide removal manager 242 also removes from slide information storage 226 any and all slide records that are child slide records of the selected slide. To do so, before deleting a slide, slide removal manager 242 locates the records in slide information storage 226 that are child slide records of the selected slide, recursively applying the process of searching for descendants of any such slide to be deleted, deleting all of them before deleting the parent, and then deleting the parent slide record, until all descendant slide records of the selected slide record and the selected slide record are deleted.

Slide removal manager 242 then recalculates the edges of the slide controls to be displayed in hierarchy window 310 by hierarchy display manager 228 below the formerly selected slide record as described above.

Slide removal manager 242 also marks a record in slide information storage 226 as selected. In one embodiment, slide removal manager 242 marks as selected the slide which was selected prior to the just-removed slide (if such slide is remaining), retrieving the indication of which slide this was from the record in slide information storage 226 described above. In another embodiment, slide removal manager 242 marks the first slide descending from the presentation slide as selected when a slide is deleted.

When slide removal manager 242 has removed the selected slide record and all slides descending from the selected slide as described above, slide removal manager 242 signals slide display manager 230, which displays the contents of the newly selected slide and signals hierarchy display manager 228, which displays the hierarchy as described above.

The User Adds Controls, Form Elements, and Scripting Language Code to a Slide

At any time, the user may add controls and scripting language commands to the contents of any slide record using control/program manager 238. Control/program manager 238 receives via a graphical user interface commands to provide controls such as buttons, and form elements such as text boxes, check boxes and the like, and receives via a text-based user interface commands to add scripting commands, to the contents of the selected slide record.

Control/program manager 238 displays in the content window 420 and stores with any contents of the current slide record any controls or form elements, including a conventional submit button, it receives, including their graphical representations and an identifier of each such control or element.

Control/program manager 238 also receives and stores scripting commands with any contents of the current slide record via a user interface it provides, and allows the user to bind scripting commands to controls, key presses and other elements.

In one embodiment, scripting commands may be added as described above that cause certain behaviors to be performed when a slide enters or leaves the compiled slide presentation.

In one embodiment, control/program manager 238 employs the user interface, and accepts and stores controls, form elements and scripting command as described in Stallons, *Flash MX Professional* 2004 *Application Development*, ISBN 0-321-23834-6 (2004 Macromedia Press), and Franklin and Makar, *Flash MX* 2004 *actionscript* ISBN 0-321-21343-2 (2004 Macromedia Press) and the help screens of the Flash MX 2004 product commercially available from Macromedia which are hereby incorporated by reference in their entirety.

Compile

At any time, the user may compile the slide presentation by selecting the command provided in a user interface, such as a menu command, provided by command manager 220. When command manager 220 receives the command to compile the slide presentation from the user, command manager 220 signals compiler 250.

Compiler 250 receives the signal from command manager 220 and proceeds to compile the content corresponding to each of the slide records into a file, and stores the file into slide file storage 258 via operating system 256. Compiler builds a conventional Flash .swf movie file using the content of the slide records, with the content from each slide record being stored as a Flash movie clip in the file. The content from each slide record is arranged in hierarchical fashion in the same hierarchical arrangement as indicated by its corresponding slide record, and the content from sibling slide records is stored the same relative order as the slide record corresponding to the content. The .swf file format is described at the web site of Macromedia.com, in the directory "/software/flash/open/licensing/fileformat/".

In one embodiment, the content of a slide record may itself have contained nested movie clips, and each such movie clip is added to the file, and their hierarchy may be preserved, however the top level of such movie clip is marked by compiler 250 in the file it builds.

When compiler 250 adds the contents of the slide records, compiler adds in scripting language code, for example, to the content of the presentation slide record, that allows the user to navigate from one slide to the next as described in more detail below. The navigation scripting language code may be inserted into the file with code that causes it to be executed when the file is opened as described below.

Transfer Files or Leave Them Stored

Figure 2B:
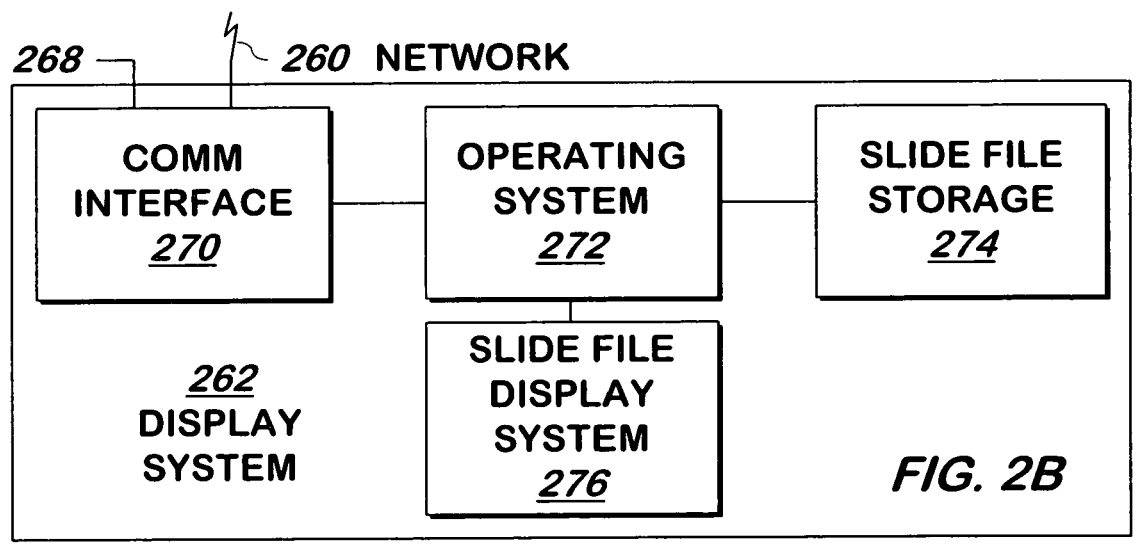

Once the slides have been compiled into frames by compiler 250 and navigation manager 252 has established the navigation instructions and stored the results into slide file storage 258 as described above, the user may choose to store the file of frames or a copy thereof on a separate computer system such as display system 262 shown in FIG. 2B or on a server (not shown) using network 260. Alternatively, the user may choose to keep the file of frames on development system 202.

The User Displays the Frames

Display system 262 is a conventional computer system and may be the same system as development system 202 or a different computer system. If the user desires to display the presentation corresponding to the file, the user signals slide file display system 276 to retrieve, via operating system 272, the file compiled as described above. The method used by display system 262 is shown in FIG. 5.

Figure 5:
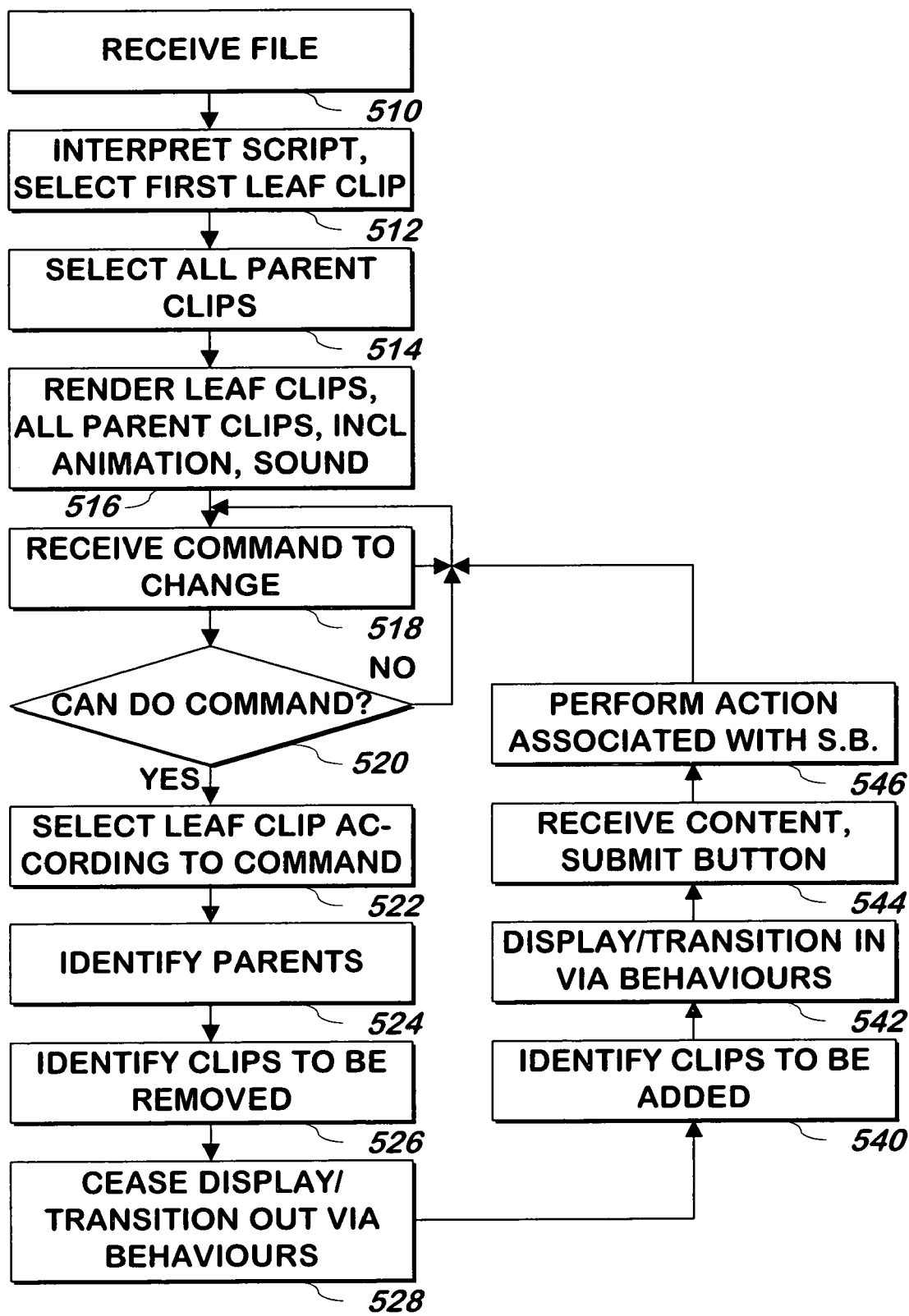
FIG. 5 is a flowchart illustrating another method of generating and displaying a presentation according to one embodiment.

Referring now to FIGS. 2B and 5, when slide file display system 276 receives the signal, slide file display system 276 requests from operating system 272 the file from the system 272 on which the file was stored as described above. Operating system 272 receives the request from slide file display system 276 and retrieves the file from the location on which it was stored as described above, optionally using network 260. If operating system 272 retrieves the file using network 260, operating system 272 stores the retrieved file into slide file storage 274. Slide file storage 274 may be disk or memory storage or both. Operating system 272 provides a handle to the file in slide file storage 274 to slide file display system 276. This procedure is represented by step 510 of FIG. 5.

When slide file display system 276 receives the handle from operating system 272, slide file display system 276 opens the file and proceeds interpret the script commands and render the contents of the slide records compiled into the file as will now be described. Slide file display system 276 accesses the file in slide file storage 274, via operating system 272, and begins to read the file. Slide file display system 276 interprets the navigation scripting language code, which instructs it to display the first leaf movie clip, and all movie clips from which the first leaf movie clip descends.

The first leaf movie clip is the movie clip that is located by selecting the movie clip corresponding to the parent slide, and by selecting the first descendant movie clip in the file (in one embodiment, only those movie clips marked as being a top level movie clip in the contents of a slide are considered when scanning for movie clips as described herein), determining if that movie clip has any descendants. If so, selecting the first descendant and repeating the process of determining if the movie clip has any descendant movie clips and if so, selecting it until a movie clip is located that has no descendant movie clips. This movie clip is selected for display by slide file display system 276. This procedure is shown in FIG. 5 as steps 512-514.

Slide file display system displays to the user the selected movie clip and all its descendant movie clips, such as via a monitor coupled to input/output 268 via operating system 272 and communication interface 270, which is similar or identical to communication interface 210. If any of these movie clips contains an animated sequence, slide file display system 276 displays portions of the movie clip or movie clips in sequence to produce an animated effect, and each such movie clip is synchronized with the others according to timing information stored in the movie clip. If any of the movie clips includes audio, slide file display system 276 generates signals for use by an audio unit in communication interface 270 and speakers (not shown) capable of playing back the audio to the user, such speakers being coupled to input/output 268, similar or identical to input/output 208 described above. This procedure is shown in step 516.

As slide file display system 276 displays the first leaf movie clip via operating system 272 and communication interface 270, slide file display system 276 awaits further commands from the user. When the user gives a command by pressing a key, clicking the mouse over a control or otherwise providing instruction, slide file display system 276 receives the command from the user via communication interface 270. This procedure is shown in step 518. Slide file display system 276 then responds, via communication interface 270, to the user's command according to the navigation instructions or other script commands corresponding to the command provided by the user as described above. In one embodiment, slide file display system 276 includes the Flash player plug in, plugged in to a commercially available browser, such as Internet Explorer. The Flash player plug in in is commercially available from Macromedia, Inc., of San Francisco, Calif.

In one embodiment, the right and left arrow keys are bound to the navigation scripting code. If the user selects the right arrow button, the code instructs slide file display system 276 to locate the next leaf movie clip and identify all of the movie clips from which it descends. The next leaf movie clip is identified by selecting the next sibling in the ordered list of siblings of the selected leaf movie clip described above, and if such a movie clip has no descendants, selecting that movie clip as the next movie clip. If the movie clip has descendants, selecting the first descendant movie clip of that movie clip and determining whether the movie clip has descendants. If not, selecting that movie clip as the next selected movie clip and if so, repeating the process of selecting the first descendant movie clip and checking for descendants until a movie clip is located with no descendants in this fashion. If the movie clip selected at the time the right arrow key was pressed has no more siblings, the parent of the selected movie clip is selected and the next sibling movie clip is selected, and the process of determining whether the movie clip has descendants and if so, selecting the first one, is repeated until a movie clip is located with no descendants. If the parent of the originally selected movie clip has no more sibling movie clips, the process of selecting its parent movie clip and looking for next siblings is repeated until such a sibling is located or the selected parent is the movie clip corresponding to the presentation slide record and there are no further descendants of such movie clip. The movie clip ultimately selected is the next leaf movie clip.

Slide file display system 276 then identifies a first list containing all of the movie clips from which the selected next leaf movie clip descends and compares them to a second list containing all of the movie clips from which the formerly selected leaf movie clip descends. Any movie clips on the first list that are not on the second list, and the newly selected leaf movie clip, are added to the display by slide file display system 276, in a manner associated with any behaviors scripted for that event. Any movie clips on the second list not on the first and the formerly selected leaf movie clip are removed from the display by slide file display system 276 in a manner associated with any behaviors' scripted for that event. When it displays movie clips, slide file display system 276 displays all such movie clips in a stacked manner as described above, but does not gray out any parent movie clips, stacking from the movie clip associated with the presentation slide on the bottom, and the leaf movie clip on top.

Any controls operated by the user on any displayed movie clip cause the associated scripting language to be executed by slide file display system 276, such as a control that causes a different set of movie clips to be added or removed from the display screen (and any scripts associated with such events to be executed by slide file display system 276). The user may enter content to form elements using conventional form user interface actions. If the user presses a submit button, the action associated with the submit button will be performed by slide file display system 276.

If the user presses the left arrow key, slide file display system 276 uses the first and second list as described above, but any movie clips on the first list that are not on the second list and the currently selected leaf movie clip are removed from the display by slide file display system 276, in a manner associated with any behaviors scripted for that event. Any movie clips on the second list not on the first and the formerly selected leaf movie clip are added to the display by slide file display system 276 in a manner associated with any behaviors scripted for that event. This procedure is shown in steps 520-546.

Referring now to FIG. 3, consisting of FIGS. 3A, 3B, and 3C, a method of generating a presentation is shown according to one embodiment of the present invention. A command is received for a new presentation 310 and a slide record corresponding to a root level presentation slide, and a slide record descending from the presentation slide are added 312, 314 to a hierarchical set of slide records used to generate slide controls and the slide presentation as described above.

The presentation slide record is located and a slide control including a thumbnail image of any contents of the presentation slide record is displayed, and an indent level is initiated 316. If there are descendants of the located slide record 318, the first descendant slide record is located, the indent level is incremented 320 and a slide control including a thumbnail of the located slide record is displayed below the prior displayed slide control according to the indent level 322 and the method continues at step 318.

If there are no descendants of the located slide record 316, if there are siblings of the located slide record 324, the next sibling slide record is located and the slide control containing the thumbnail is displayed below the prior displayed slide control according to the indent level and the method continues at step 318, and otherwise 324, the indent level is decremented and the parent slide record of the located slide record is located 328. If the located slide record is the presentation slide 330, the method continues at step 332 of FIG. 3B and otherwise 330, the method continues at step 324.

Steps 322 or 326 may include highlighting the slide control for the slide selected as described below, and displaying horizontal and vertical lines to indicate the hierarchical level of the slide as described above.

At step 332, an action is received. If the action corresponds to a command to select a slide control 334, the slide control indicated by the user is detected as described above and the control including the thumbnail is highlighted and its corresponding slide record is marked as selected as described above 336. The contents of the slide record are displayed 338 in a content window that allows the user to view the contents in detail and alter them if desired. The method continues at step 316 of FIG. 3A.

If the action is a change to the contents of the selected slide record displayed in the content window 334, the change is received and stored and the thumbnail image is updated 342 and the method continues at step 316 of FIG. 3A.

If the action is a command to add a slide, a slide record is added to the set of slide records as the next sibling slide record of the selected slide record 344 and the newly added slide is selected 346 and the method continues at step 316 of FIG. 3A.

If the action corresponds to a command to add a child slide 334, a slide record is added to the set of slide records as a child of the selected slide record at the end of the list of such children 348, the newly added slide record is selected 350 and the method continues at step 316 of FIG. 3A.

If the action corresponds to a delete command 334, the selected slide record and its descendants are deleted 354 as described above and the method continues at step 316 of FIG. 3A.

If the action corresponds to a command to move the selected slide record either to have a different parent in the hierarchy or within the ordered list of siblings of the same parent of the selected slide record 334, the position of the mouse cursor relative to the slide indicators is detected 356 as described above and an indicator is displayed as described above that indicates the parent and order within that parent's siblings of the selected slide, were the mouse cursor to be released at the detected position as described above 358. If the user does not release the mouse at that position 360, the method continues at step 356 and otherwise 360, the parent is detected and order within the siblings of that parent is detected based on the mouse cursor position 362 in the same manner as the indicator is identified 362, and the selected slide record is caused to descend from the parent slide record as a child in the order indicated, with the descendant slide records of the selected slide record remaining as descendants of the selected slide record 366, and the method continues at step 316 of FIG. 3A.

If the action is a compile command 334, the method continues at step 370 of FIG. 3C. The first leaf slide record is selected 370 and a finished set of one or more frames is built and stored in a file using the contents of the slide record selected and the contents of the slide records from which the selected slide descends as described above 374, and navigation instructions are retrieved. If the leaf slide record is neither the first or the last leaf slide 376, navigation instructions and, optionally behaviors, for such type of file are added for such type of slide record, either to a file containing the set of one or more frames or to a separate file that references such file 378, and the method continues at step 384. Step 378 may follow step 374 unconditionally in one embodiment, as indicated by the dashed line in the Figure.

If the selected leaf slide record is the first leaf slide record 376 in the presentation, navigation instructions and, optionally behaviors, are added for such type of slide record, either to a file containing the set of one or more frames or to a separate file that references such file 380, and the method continues at step 384.

If the selected leaf slide record is the last leaf slide record 376 in the presentation, navigation instructions and, optionally behaviors, for such type of file are added for such type of slide record, either to a file containing the set of one or more frames or to a separate file that references such file 382, and the method continues at step 384.

At step 384 if there are more leaf slide records in the presentation, the next leaf slide record is selected 386 and the method continues at step 372 and otherwise 384, the one or more files containing instructions, behaviors, content or any of these are completed if necessary and closed 388 and the method continues at step 332. The one or more files may be used to display the presentation as described above.

What is claimed is:

1. A method of generating a presentation, comprising:
    displaying a hierarchy of a plurality of content to be used in a presentation; and
    digitally generating the presentation responsive to the content and the hierarchy such that each displayed slide of the presentation is rendered using content of a leaf node and content of at least one parent node of the leaf node in the hierarchy.

2. The method of claim 1, additionally comprising:
    receiving a command to display a different leaf content in the presentation;
    displaying the different leaf content with parent content of the different leaf content responsive to the receipt of the command;
    generating one or more scripts to control one or more behaviors of the plurality of content during the presentation; and
    performing a script from the one or more scripts associated with such display of such different leaf content.

3. The method of claim 2, wherein generating the one or more scripts comprises receiving from an author of the presentation one or more scripting commands.

4. The method of claim 2, additionally comprising:
    ceasing the display of the leaf content; and
    performing a script from the one or more scripts associated with such cessation of display of such different leaf content.

5. The method of claim 4, wherein generating the one or more scripts comprises receiving from an author of the presentation one or more scripting commands.

6. The method of claim 1, wherein the presentation comprises vector graphics.

7. The method of claim 1, additionally comprising:
    receiving a graphical command to change a position in the hierarchy of at least one of the content in the plurality of content; and
    changing the hierarchy based on the command.

8. The method of claim 1, additionally comprising providing the presentation over a network.

9. A computer program product comprising a computer useable medium having computer readable program code embodied therein for generating a presentation, the computer program product comprising computer readable program code devices configured to cause a computer system to:
    display a hierarchy of a plurality of content to be used in a presentation; and
    digitally generate the presentation responsive to the content and the hierarchy such that each displayed slide of the presentation is rendered using content of a leaf node and content of at least one parent node of the leaf node in the hierarchy.

10. The computer program product of claim 9, additionally comprising computer readable program code devices configured to cause the computer system to:
    receive a command to display a different leaf content in the presentation;
    display the different leaf content with parent content of the different leaf content responsive to the receipt of the command;
    generate one or more scripts to control one or more behaviors of the plurality of content during the presentation; and
    perform a script from the one or more scripts associated with such display of such different leaf content.

11. The computer program product of claim 10, wherein generating the one or more scripts comprises receiving from an author of the presentation one or more scripting commands.

12. The computer program product of claim 10, additionally comprising computer readable program code devices configured to cause the computer system to:
    cease the display of the leaf content; and
    perform a script from the one or more scripts associated with such cessation of display of such different leaf content.

13. The computer program product of claim 12, wherein generating the one or more scripts comprises receiving from an author of the presentation one or more scripting commands.

14. The computer program product of claim 9, wherein the presentation comprises vector graphics.

15. The computer program product of claim 9, additionally comprising computer readable program code devices configured to cause the computer system to:
    receive a graphical command to change a position in the hierarchy of at least one of the content in the plurality of content; and
    change the hierarchy based on the command.

16. The computer program product of claim 9, additionally comprising computer readable program code devices configured to cause the computer system to provide the presentation over a network.

17. A system comprising:
    an output device; and
    a computer programmed to perform operations comprising:
        displaying a hierarchy of a plurality of content to be used in a presentation on the output device; and
        digitally generating the presentation responsive to the content and the hierarchy such that each displayed slide of the presentation is rendered using content of a leaf node and content of at least one parent node of the leaf node in the hierarchy.

18. The system of claim 17, the computer programmed to perform operations comprising:
    receiving a command to display a different leaf content in the presentation;
    displaying the different leaf content with parent content of the different leaf content responsive to the receipt of the command;
    generating one or more scripts to control one or more behaviors of the plurality of content during the presentation; and
    performing a script from the one or more scripts associated with such display of such different leaf content.

19. The system of claim 18, wherein generating one or more scripts comprises receiving from an author of the presentation one or more scripting commands.

20. The system of claim 18, the computer programmed to perform operations comprising:

ceasing the display of the leaf content; and performing a script from the one or more scripts associated with such cessation of display of such different leaf content.

21. The system of claim 20, wherein generating one or more scripts comprises receiving from an author of the presentation one or more scripting commands.

22. The system of claim 17, wherein the presentation comprises vector graphics.

23. The system of claim 17, the computer programmed to perform operations comprising:

receiving a graphical command to change a position in the hierarchy of at least one of the content in the plurality of content; and changing the hierarchy based on the command.

24. The method of claim 17, the computer programmed to perform operations comprising:

providing the presentation over a network.

* * * * *

UNITED STATES PATENT AND TRADEMARK OFFICE
CERTIFICATE OF CORRECTION

PATENT NO. : 7,526,726 B1
APPLICATION NO. : 11/213185
DATED : April 28, 2009
INVENTOR(S) : Edward Skwarecki, Bob Pappas and Ken Ecky It is certified that error appears in the above-identified patent and that said Letters Patent is hereby corrected as shown below:

Column 24, line 5, delete "method" and insert --system--.

Signed and Sealed this

Twenty-fourth Day of November, 2009

David J. Kappos
*Director of the United States Patent and Trademark Office*